(12) United States Patent
Kurita et al.

(10) Patent No.: US 11,884,283 B2
(45) Date of Patent: Jan. 30, 2024

(54) VEHICLE DEVICE

(71) Applicant: DENSO CORPORATION, Kariya (JP)

(72) Inventors: Tetsuo Kurita, Kariya (JP); Hatsuho Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 17/456,121

(22) Filed: Nov. 22, 2021

(65) Prior Publication Data

US 2022/0080983 A1    Mar. 17, 2022

Related U.S. Application Data

(63) Continuation of application No. PCT/JP2020/018674, filed on May 8, 2020.

(30) Foreign Application Priority Data

May 31, 2019    (JP) ................... 2019-102726

(51) Int. Cl.
*B60W 50/00*    (2006.01)
*B60W 50/04*    (2006.01)
*B60W 50/08*    (2020.01)
*G07C 5/08*    (2006.01)

(52) U.S. Cl.
CPC ...... *B60W 50/0098* (2013.01); *B60W 50/045* (2013.01); *B60W 50/087* (2013.01); *G07C 5/085* (2013.01); *G07C 5/0816* (2013.01)

(58) Field of Classification Search
None
See application file for complete search history.

(56) References Cited

U.S. PATENT DOCUMENTS

| | | | |
|---|---|---|---|
| 9,778,970 B2 * | 10/2017 | Kume | G06F 11/0793 |
| 9,958,846 B2 * | 5/2018 | Takeda | G06F 11/30 |
| 10,585,755 B2 * | 3/2020 | Yamamoto | G06F 11/0724 |
| 2002/0075165 A1 | 6/2002 | Yoshioka et al. | |
| 2008/0141283 A1 | 6/2008 | Minemura et al. | |
| 2015/0033072 A1 | 1/2015 | Barr et al. | |
| 2018/0150359 A1 * | 5/2018 | Yamamoto | G06F 11/0757 |
| 2020/0233702 A1 | 7/2020 | Okabe | |
| 2021/0174606 A1 * | 6/2021 | Cho | G07C 5/085 |

FOREIGN PATENT DOCUMENTS

| | | | |
|---|---|---|---|
| JP | 2001075741 A | 3/2001 |
| JP | 3343816 B2 | 11/2002 |
| JP | 2006277062 A | 10/2006 |
| JP | 2011022934 A | 2/2011 |
| JP | 6242557 B1 | 12/2017 |

* cited by examiner

*Primary Examiner* — James M McPherson
(74) *Attorney, Agent, or Firm* — Harness, Dickey & Pierce, P.L.C.

(57) ABSTRACT

A vehicle device in one embodiment includes: a control unit in which a system is built, a plurality of operating systems operating on the system; and a plurality of monitoring units that are configured to monitor a defect in the system. Each of the plurality of monitoring units is further configured to: perform monitoring at a respective one of a plurality of layers into which the system are divided; and solve a defect at the respective one of the plurality of layers when the defect occurs.

6 Claims, 5 Drawing Sheets

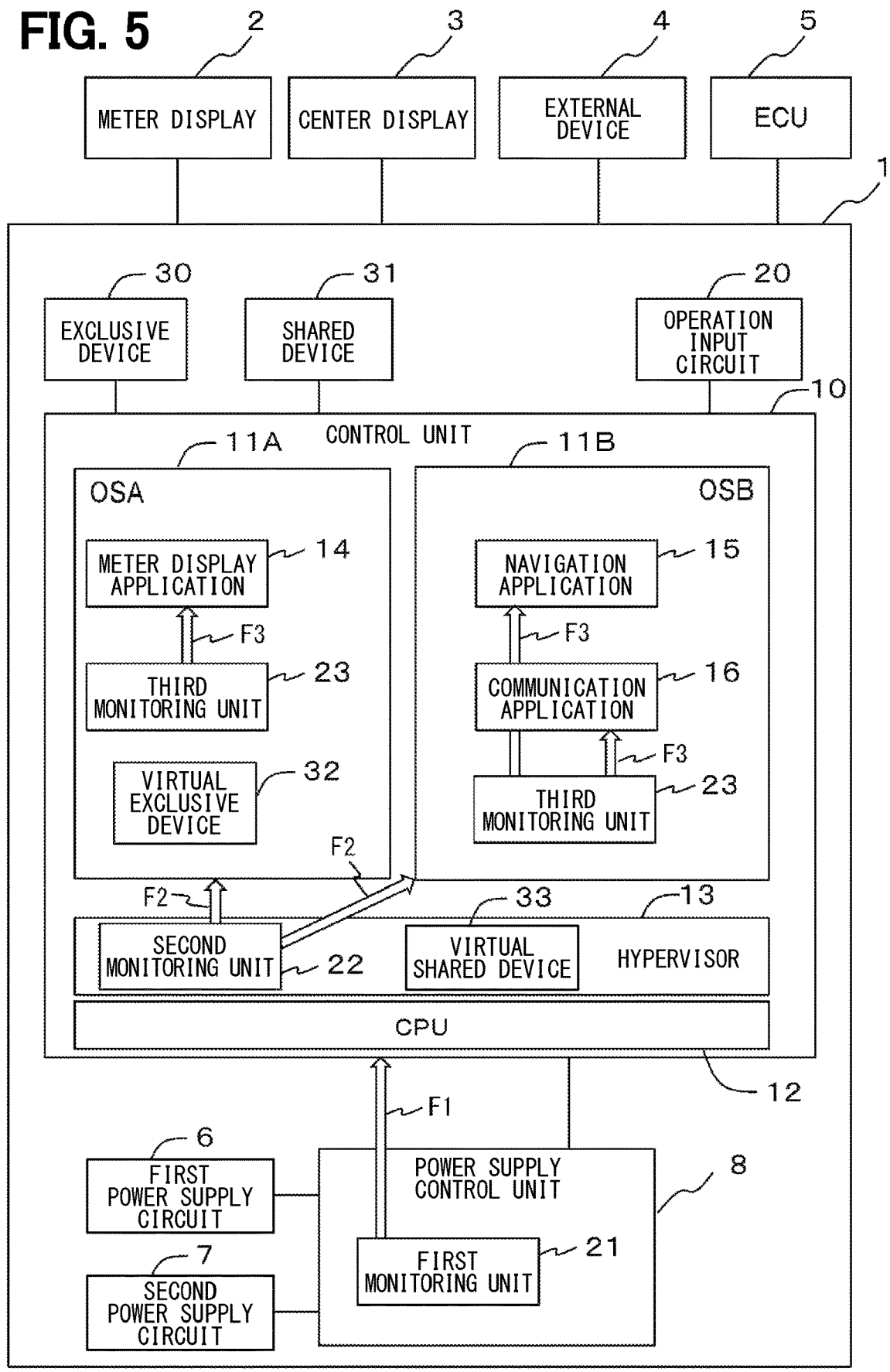

VEHICLE DEVICE

This application is a continuation application of International Patent Application No. PCT/JP2020/018674 filed on May 8, 2020, which designated the U.S. and claims the benefit of priority from Japanese Patent Application No. 2019-102726 filed on May 31, 2019. The entire disclosure of all of the above application is incorporated herein by reference.

TECHNICAL FIELD

The present disclosure relates to a vehicle device.

BACKGROUND ART

Conventionally, a vehicle device is provided with a returning means that is activated when a problem occurs. For example, a typical vehicle device includes a main control unit and a sub control unit, and a defect is solved by restarting the control unit in which the defect occurs.

SUMMARY

According to one aspect of the present disclosure, a vehicle device includes: a control unit in which a system is built, a plurality of operating systems operating on the system; and a plurality of monitoring units that are configured to monitor a defect in the system. Each of the plurality of monitoring units is further configured to: perform monitoring at a respective one of a plurality of layers into which the system are divided; and solve a defect at the respective one of the plurality of layers when the defect occurs. The plurality of monitoring units include a first monitoring unit that is configured to perform monitoring at a first layer outside of the control unit where the control unit is a monitoring target, a second monitoring unit that is configured to perform monitoring at a second layer above the control unit where the plurality of operating systems are a monitoring target, and a third monitoring unit that is configured to perform monitoring at a third layer above the plurality of operating systems where application programs are a monitoring target. The first monitoring unit is configured to solve a defect by restarting the entire control unit when the defect occurs in the control unit. The second monitoring unit is configured to, when a defect occurs in one of the plurality of operating systems, solve the defect by restarting the one of the plurality of operating systems. The third monitoring unit is configured to, when a defect occurs in one of the application programs, solve the defect by restarting the one of the application programs.

BRIEF DESCRIPTION OF DRAWINGS

FIG. 5 is a diagram schematically showing another configuration of the vehicle device.

DESCRIPTION OF EMBODIMENTS

To begin with, a relevant technology will be described first only for understating the following embodiments.

In recent years, in addition to a functional unit that presents information related to a vehicle such as speed, a vehicle device also includes another functional unit that provides so-called multimedia information such as a navigation screen image. In such a vehicle device, a plurality of operating systems are operating in order to realize a plurality of functional units. Hereinafter, an operating system will be referred to as an OS.

However, when a plurality of functions are realized by operating a plurality of OSs, for example, when a defect occurs in one of functions, the entire vehicle device has to be restarted under the conventional configuration where the entire system is restarted. As a result, other normally operating functions cannot keep operating. This also applies when a defect occurs in an application program running on each OS.

One objective of the present disclosure is to provide a vehicle device that is configured to solve a defect while reducing a negative impact on other normally operating functions when the defect occurs under an environment where a plurality of functions are operating.

To achieve the above-described objective, a vehicle device according to the above-described aspect of the present disclosure includes: a control unit in which a system is built, a plurality of operating systems operating on the system; and a plurality of monitoring units that are configured to monitor a defect in the system. Each of the plurality of monitoring units is further configured to: perform monitoring at a respective one of a plurality of layers into which the system are divided; and solve a defect at the respective one of the plurality of layers when the defect occurs.

According to the above-configuration, a target area where a defect is to be solved is limited to each layer. Thus, it is possible to solve a defect while reducing a negative impact on other normally operating functions when the defect occurs under an environment where a plurality of functions are operating.

According to another aspect of the present disclosure, a vehicle device include: a control unit in which a system is built, a plurality of operating systems operating on the system; and a plurality of monitoring units that are configured to monitor a defect in the system. Each of the plurality of monitoring units is further configured to: perform monitoring at a respective one of a plurality of layers into which the system are divided; and solve a defect at the respective one of the plurality of layers when the defect occurs. Each of the plurality of monitoring units is further configured to have a device, which is used at the respective one of the plurality of layers, included in an initialization target when solving a defect at the layer.

Figure 1:
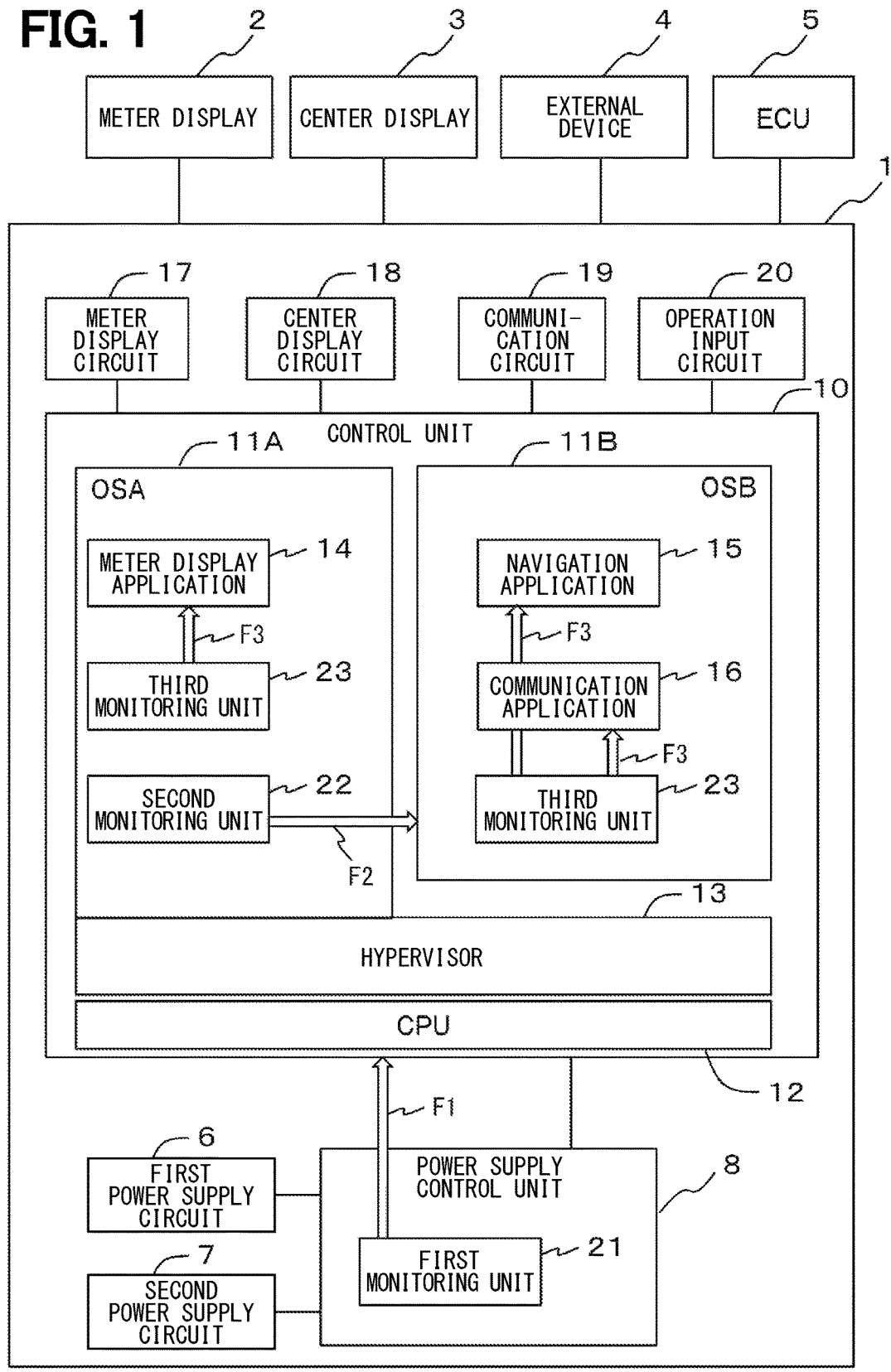
FIG. 1 is a diagram schematically showing a configuration of a vehicle device according to an embodiment.

Hereinafter, an embodiment will be described. As shown in FIG. 1, a vehicle device 1 is connected to displays such as a meter display 2 and a center display 3, an external device 4 such as a portable terminal carried by a user, another ECU 5 mounted in a vehicle, and a power supply controller 8 configured to control a first power supply circuit 6 and second power supply circuit 7.

The vehicle device 1 is a so-called vehicle infotainment device configured to present information related to the vehicle and multimedia information, as will be described later. The configuration shown in FIG. 1 is an example and the present disclosure is not limited to the configuration shown in FIG. 1. For example, the vehicle may be provided with a large number of ECUs 5, and the vehicle device 1 may be connected to the large number of ECUs 5 so as to communicate various information therewith.

The meter display 2 is, for example, a liquid crystal display or an organic EL display, and is disposed on a meter panel located in front of a driver. The meter display 2 mainly displays, in full graphic, a vehicle speed, warning, information stipulated by law, information indicative of a state of the vehicle such as a remaining amount of fuel and whether a seatbelt is fastened, and information related to a traveling state or safety of the vehicle. Hereinafter, these information will be referred to as "vehicle information" for convenience. Alternatively, the meter display 2 may be located in the center portion of the meter panel, and analog-type speedometer, tachometer, and warning lights may be used.

The center display 3 is, for example, a liquid crystal display or an organic EL display, and is disposed close to a so-called center console. The center display 3 displays, for example, a navigation screen image and a menu screen image. The center display 3 can also display TV programs, information about a music which is being played.

The meter display 2 and the center display 3 can display information by seamlessly linking with one another. For example, the navigation screen can be displayed on the meter display 2, while the vehicle speed can be displayed on the center display 3.

That is, in the vehicle device 1, multiple functional units including a functional unit that displays the vehicle information and a functional unit that displays multimedia information are integrated so as to provide various information. Thus, the vehicle device 1 is an integrated type device that is configured to present information visually and audibly to the driver.

The vehicle device 1 is controlled by a single control unit 10. The control unit 10 is a so-called microcomputer, and controls the vehicle device 1 by executing computer programs stored in a storage unit (not shown) on a CPU 12. A system on which multiple operating systems 11 can operate is established by the control unit 10. Hereinafter, the operating system 11 will be referred to as an OS 11.

In the present embodiment, two OS 11A and OS 11B are operating on the control unit 10, and the OSs 11A and 11B operate by splitting processes among them. These OSs 11 are assigned to a plurality of cores in the CPU 12.

More specifically, the OSs 11 run on a hypervisor 13. In the present embodiment, the hypervisor 13 is provided as a function of the OS 11A. Alternatively, the hypervisor 13 may be provided for each of the OSs 11A and 11B to run both the OS 11A and the OS 11B on the hypervisors 13. The OS 11A and the OS 11B are communicably connected to one another.

The OS 11A is a so-called real-time OS, and includes functional blocks that mainly execute a process (e.g., a process related to vehicle travelling or safety) that requires a real-time response as compared with the OS 11B. In general, such a real-time OS is less likely to cause a problem in the OS 11A itself, and tends to have relatively higher stability than a general-purpose OS because execution time of an application program is predictable and/or controllable. Hereinafter, an application program will also be referred to as an application. The OS 11A corresponds to a first operating system.

The OS 11B is a so-called general-purpose OS. Although its required real-time response and stability are relatively low as compared with the OS 11A, it has an advantage that general-purpose processing such as a so-called multimedia function can be easily executed. The OS 11B corresponds to a second operating system.

Each of OSs 11 serves as various functional units realized by software by executing various applications. The control unit 10 includes, as functional units, a meter display application 14, a navigation application 15, and a communication application 16. The number and types of functional units shown in FIG. 1 or the OSs 11 on which the functional units are implemented are merely illustrated as exemplary configurations, and the present disclosure is not necessarily limited to the configuration shown in FIG. 1.

The meter display application 14 is provided as a functional unit configured to mainly provide displaying on the meter display 2. The meter display application 14 displays information such as a speedometer necessary for the vehicle to travel. The application 14 updates the display image at a relatively short cycle, for example, about $\frac{1}{60}$ second. Therefore, the meter display application 14 is implemented in the OS 11A. The images displayed by the meter display application 14 are transmitted to the meter display 2 as image data in LVDS format, for example.

The navigation application 15 is provided as a functional unit configured to mainly provide displaying on the center display 3. This navigation application 15 executes a multimedia process for generating and displaying a navigation screen and outputting audio for route guidance. Therefore, the navigation application 15 is implemented on the OS 11B. The images displayed by the navigation application 15 are transmitted to the center display 3 as image data in LVDS format, for example.

The communication application 16 is provided as a functional unit configured to communicate with the external device 4 connected to the vehicle device 1. The communication application 16 may communicate with the external device 4 using publicly-known communication methods such as USB, Bluetooth (registered trademark), Wi-Fi, or the like. The external device 4 may include a tablet, a USB memory, a server on the Internet, or the like, in addition to the above-described portable terminal.

The vehicle device 1 is supplied with power from the first power supply circuit 6 and the second power supply circuit 7. The first power supply circuit 6 mainly supplies power to devices for processing or displaying information for the control system, such as the control unit 10 and the meter display circuit 17. The first power supply circuit 6 receives power from a battery (not shown), and has a low-voltage compatible circuit configuration so that power can be supplied to the control unit 10 and the like even when battery voltage is relatively low. Specifically, the first power supply circuit 6 has a minimum operating voltage at which power can be supplied, and the minimum operating voltage is set to be lower than the minimum value of the battery voltage required at the time of cranking so that power can be supplied even when the voltage from the battery drops during cranking at the time of starting the engine.

The second power supply circuit 7 mainly supplies power to devices for processing or displaying information for the multimedia system, such as the center display circuit 18 and the communication circuit 19. Although the second power supply circuit 7 also receives power from the battery, unlike the first power supply circuit 6, the second power supply circuit 7 does not have a circuit configuration compatible with low voltage. Specifically, in the second power supply circuit 7, the minimum operating voltage at which power can be supplied is set to be higher than that in the first power supply circuit 6, and thus the power supply may be stopped when the battery voltage drops during cranking.

The power supply control unit 8 is configured by a different microcomputer than the control unit 10. When a signal for starting the vehicle device 1 is input from the ECU 5, the power supply control unit 8 allows the first power supply circuit 6 and the second power supply circuit 7 to supply power. When a signal for stopping the vehicle device 1 is input from the ECU 5, the power supply control unit 8 controls the first power supply circuit 6 and the second power supply circuit 7 to stop power supply.

The vehicle device 1 can be started or stopped through a user's operation input via an operation input circuit 20. The operation input circuit 20 has an operation unit formed of a touch panel provided for each of the screens of the meter display 2 and the center display 3, an operation switch (not shown), and the like.

Further, the vehicle device 1 includes a first monitoring unit 21, a second monitoring unit 22, and a third monitoring unit 23 in the present embodiment. The first monitoring unit 21 is a functional unit realized by software through a computer program executed on the power supply control unit 8.

As will be described later, the first monitoring unit 21 is provided for a first layer that is the highest layer in a layer structure formed by dividing the system of the vehicle device 1 into a plurality of layers. The unit 21 performs monitoring at the first layer where the control unit 10 is a monitoring target. The first monitoring unit 21 monitors the control unit 10 as shown by an arrow F1, and when a problem or defect occurs in the control unit 10, the problem is solved by restarting the entire control unit 10.

As will be described later, the second monitoring unit 22 is provided for a second layer next to the highest layer in the layer structure where the system of the vehicle device 1 is divided into the plurality of layers. The unit 22 performs monitoring at the second layer where the OS 11 is a monitoring target. In this embodiment, the second monitoring unit 22 is disposed on the OS 11A. The second monitoring unit 22 monitors the OS 11B as shown by the arrow F2, and when a problem occurs in the OS 11B, the problem is solved by restarting the OS 11B.

As will be described later, the third monitoring unit 23 is provided for a second layer that is the lowest layer in the layer structure where the system of the vehicle device 1 is divided into the plurality of layers. The unit 23 performs monitoring at the second layer where applications running on the OS 11 are a monitoring target. In the present embodiment, the third monitoring unit 23 is disposed on each of the OSs 11.

The third monitoring unit 23 monitors each application as shown by the arrow F3, and when a problem occurs in the application, the problem is solved by restarting the application. At this time, the third monitoring unit 23 basically restarts the application in which the problem has occurred, but does not restart other applications in which a problem has not occurred.

That is, in the vehicle device 1, the system is divided into the plurality of layers at a program level, and monitoring is performed for each layer, and a higher layer has a larger range than that of a lower layer to be monitored (i.e., a larger range to restart) when a problem occurs.

Next, the operation of the vehicle device 1 having the above-described configuration will be described.

The plurality of OSs11 are operating in the vehicle device 1, and it is considered that OS11A is relatively and generally highly stable and less likely to cause a problem.

This is also due to the fact that processing on the OS 11A is basically related to the inside matter of the vehicle device 1, and therefore development and debugging have been sufficiently performed.

On the other hand, the OS 11B performs general-purpose processing, and may operate using data acquired from an outside of the vehicle device 1. Therefore, there will be a difference in quality level between OS 11A and OS 11B. In other words, the risk of occurrence of a failure is relatively high in OS 11B.

Then, even if a problem occurs in the OS 11B, the OS11A, which is basically operating independently, can continue its operation without being affected by the problem of the OS 11B. However, in the conventional configuration where the control unit 10 is entirely restarted when a problem occurs, the entire control unit 10 would be restarted even if a problem occurs in a small portion of the application. In other words, if a problem occurs in a portion of a plurality of functions, all the functions would be restarted regardless of the affected range where the problem should be resolved. Therefore, operation of the OS 11A where a problem does not occur would not continue.

Therefore, when a problem occurs in an environment where a plurality of functions operate, the vehicle device 1 solves the problem while reducing a negative impact on other functions that are normally operating. Although the following processing is performed by each monitoring unit, the vehicle device 1 will be described as a subject that performs the processing only for simplification purposes.

Figure 2:
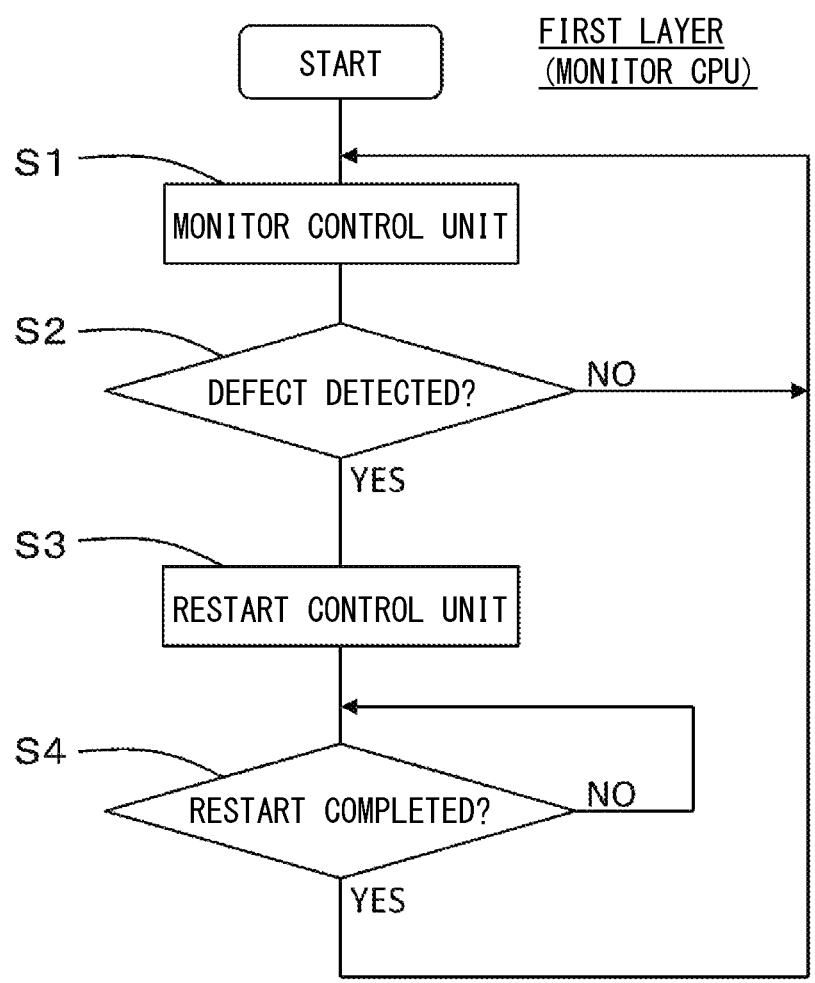
FIG. 2 is a diagram showing a flow of a monitoring process executed by a first monitoring unit.
Figure 3:
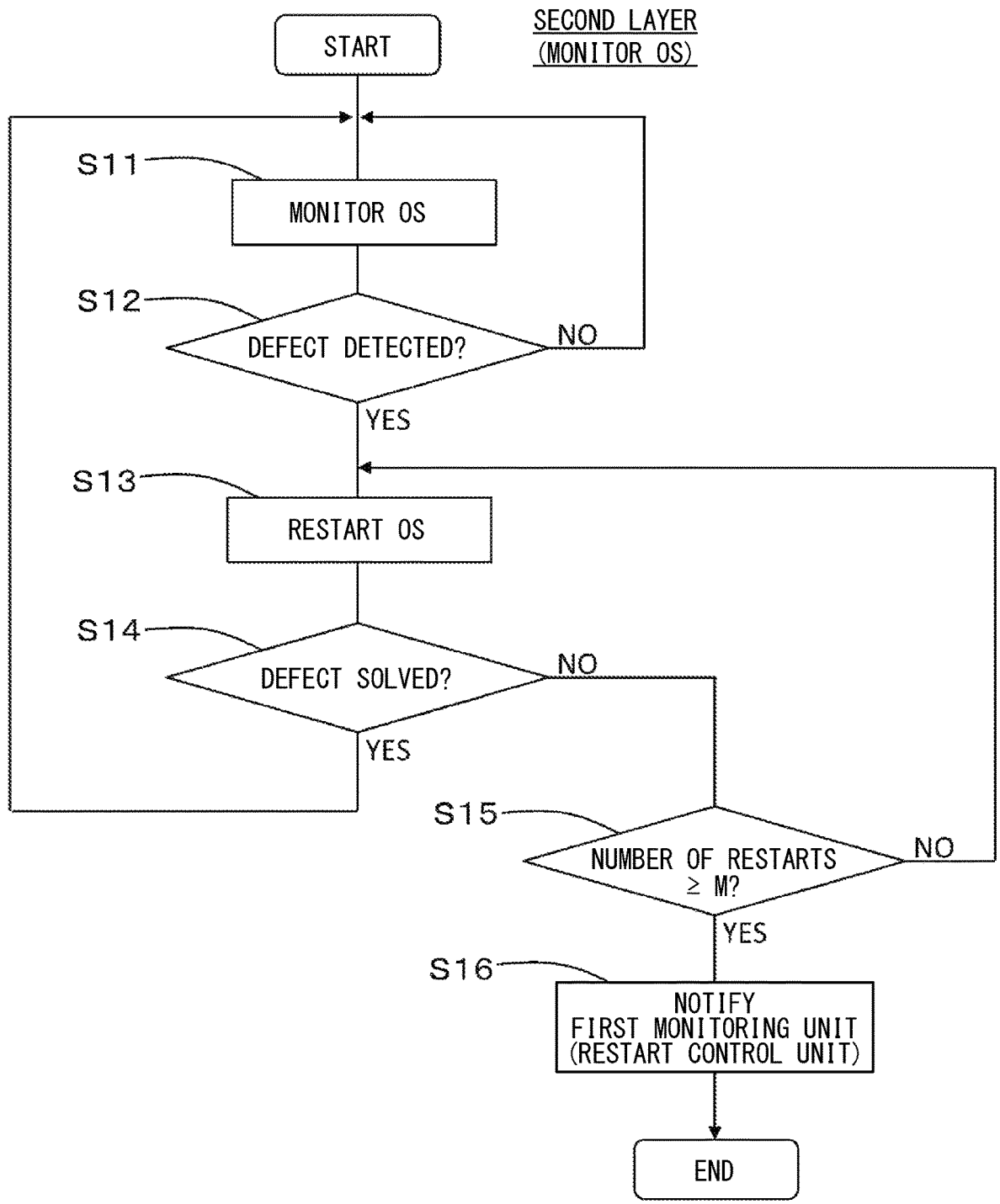
FIG. 3 is a diagram showing a flow of a monitoring process executed by a second monitoring unit.
Figure 4:
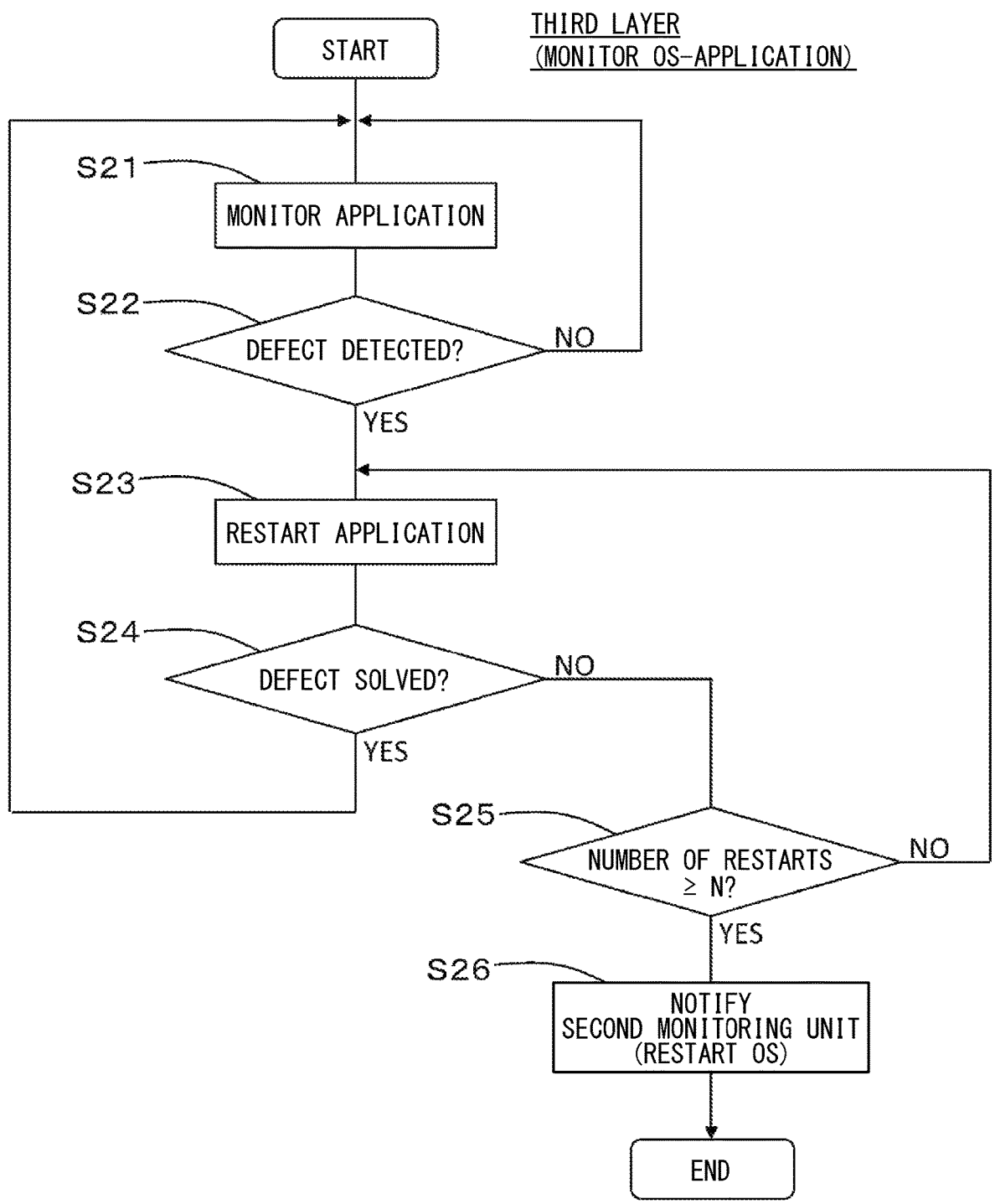
FIG. 4 is a diagram showing a flow of a monitoring process executed by a third monitoring unit.

The vehicle device 1 executes processes shown in FIGS. 2 to 4. The process shown in FIG. 2 is a monitoring process between CPUs executed by the first monitoring unit 21. The process shown in FIG. 3 is a monitoring process between the OSs 11 executed by the second monitoring unit 22. The process shown in FIG. 4 is a monitoring process between the OS 11 and applications executed by the third monitoring unit 23. Next, each process will be described individually.

First, monitoring a defect in the first layer and a solving method will be described. The vehicle device 1 is executing the process shown in FIG. 2, and at step S1, monitoring of the control unit 10 is started. At this time, the vehicle device 1 performs, for example, lock monitoring, infinite loop, reset monitoring, communication blackout monitoring, start-up time monitoring, and the like. Since these monitoring are generally known, detailed explanations are omitted, but in the lock monitoring, a defect that a program is not executed is monitored. Also, in the infinite loop, a defect that the program loops is monitored. Further, in the reset monitoring, a defect that the control unit 10 is in a reset state is monitored. Further, in the communication blackout monitoring, a defect that communication with the control unit 10 is interrupted is monitored. In the startup time monitoring, whether the module has started within a preset time is monitored.

Although the targets for monitoring are different, the monitoring contents are also common to the monitoring process between OSs 11 shown in FIG. 3 and the monitoring process between OS 11 and the application shown in FIG. 4, as will be described later. However, monitoring is not necessarily limited to the above examples, and other targets can be monitored.

When monitoring is started, the vehicle device 1 determines, at step S2, whether a defect is detected. When the monitoring application 35 determines that no defect is detected, the result at step S1 is NO, and the monitoring application 35 repeats step S1. On the contrary, when the vehicle device 1 determines that a defect is detected, the result at step S2 is YES, and then the vehicle device 1 restarts the control unit 10 at step S3. As a result, a defect in the control unit 10, in other words, a defect that would affect a wide range of the entire system of the vehicle device 1 is eliminated.

After that, the vehicle device 1 determines, at step S4, whether the restart is completed, and if the restart is determined to be not completed, the result at step S4 is NO, and thus the process waits until the restart is completed. On the contrary, when the restart is determined to be completed, i.e., YES at step S4, the process proceeds to step S1 and the vehicle device 1 starts monitoring the control unit 10. The process shown in FIG. 2 ends when the vehicle device 1 is stopped.

As described above, by restarting the control unit 10, the vehicle device 1 solves the problem that would affect the entire system of the vehicle device 1.

Next, monitoring a defect at the second layer and its solving method will be described. The vehicle device 1 is executing the process shown in FIG. 3, and at step S11, monitoring of the OS 11B is started. At this time, the vehicle device 1 performs the above-described lock monitoring, infinite loop, reset monitoring, communication blackout monitoring and the like.

When monitoring is started, the vehicle device 1 determines, at step S12, whether a defect is detected. When no defect is determined to be detected, the result at step S12 is NO, and the monitoring repeats at step S11. On the contrary, when the vehicle device 1 determines that a defect is detected, the result at step S12 is YES, and thus the vehicle device 1 restarts the OS 11B at step S13.

After that, the vehicle device 1 determines at step S14 whether the defect has been resolved after restarting the OS 11B. Note that this step S14 will be executed after the OS 11B is restarted. When the vehicle device 1 determines that the defect was solved by restarting the OS 11B, the result at step S14 is YES, and the vehicle device 1 repeats monitoring at step S11.

Accordingly, the defect that would affect OS11B is eliminated. At this time, operation of the OS 11A in which no defect is detected is basically continued. That is, the defect can be solved while the range affected by the problem is limited to only the OS11B.

On the other hand, when the vehicle device 1 determines that the defect has not been solved, the result is NO at step S14. Therefore, at step S15, the vehicle device 1 determines whether the number of restarting exceeds a predetermined number of M or more. In the present embodiment, M=2, but M can be set to an appropriate other value such as 1 or 3 or more. When the vehicle device 1 determines that the number of restarting does not exceed M or more, the result at step S15 is NO, and the process proceeds to step S13 and the restart is repeated.

After the vehicle device 1 repeatedly restarts and when the number of restarting exceeds M or more (YES at step S15), the vehicle device 1 sends a notification to the first monitoring unit 21. At this time, the vehicle device 1 notifies the first monitoring unit 21 that the defect could not be solved at the second layer. At step S15, instead of notification of the defect, an instruction to restart the control unit 10 may be directly sent.

Then, the first monitoring unit 21 that receives the notification determines that the defect is detected as shown in FIG. 2, and restarts the control unit 10 to solve the defect. As a result, the defect that could not be solved even by restarting the OS 11B, that is, the defect that could not be solved at the second layer, is solved by the first monitoring unit 21 that monitors the first layer.

In this way, the vehicle device 1 solves a defect that can be solved by restarting the OS 11 at the second layer, but if a defect that cannot be solved at the second layer occurs, the defect is solved by sending a notification to the first monitoring unit 21 that is on an upper layer where a defect can be solved for a wider range.

Next, monitoring of a defect at the third layer and its solving method will be described. The vehicle device 1 is executing the process shown in FIG. 4, and at step S21, monitoring of the application running on the OS 11B is started. At this time, the vehicle device 1 performs the above-described lock monitoring, infinite loop, reset monitoring, communication blackout monitoring and the like. The monitoring at the third layer is performed by both the OS 11A and the OS 11B.

When monitoring is started, the vehicle device 1 determines, at step S22, whether a defect is detected. When the monitoring application 35 determines that no defect is detected, the result at step S22 is NO, and the monitoring application 35 repeats at step S21. On the contrary, when the vehicle device 1 determines that a defect is detected, the result at step S22 is YES, and then the vehicle device 1 restarts the application from which the defect was detected at step S23.

After that, the vehicle device 1 determines at step S24 whether the defect has been solved after restarting the application. Note that this step S24 will be executed after the application is restarted. When the vehicle device 1 determines that the defect was solved by restarting the application, the result at step S24 is NO, and the vehicle device 1 repeats the process at step S21.

As a result, a defect that occurs in the application can be solved by restarting the application itself. At this time, operation of other applications from which no defect has been detected continues. That is, the defect can be solved while the range affected by the defect is limited only to the application.

On the other hand, when the vehicle device 1 determines that the defect has not been solved, the result is NO at step S24. Therefore, at step S25, the vehicle device 1 determines whether the number of restarting exceeds a predetermined number of N or more. In the present embodiment, N=2, but N can be set to an appropriate value such as 1 or 3 or more. When the vehicle device 1 determines that the number of restarting does not exceed N or more, the result at step S25 is NO, and the process proceeds to step S23 and the restart is repeated.

After the vehicle device 1 repeatedly restarts and when the number of restarting is N or more (YES at step S25), the vehicle device 1 sends a notification to the second monitoring unit 22. At this time, the vehicle device 1 notifies the second monitoring unit 22 that the defect could not be solved at the third layer. At step S25, instead of sending a notification to the defect, an instruction to restart the OS 11B on which the application from which the defect was detected is running may be directly sent.

Then, the second monitoring unit 22 that receives the notification determines that the defect is detected as shown in FIG. 3, and restarts the OS 11 to solve the defect. At this time, if the defect cannot be solved even in the second layer, the first monitoring unit 21 is given a notification and the control unit 10 is restarted.

As a result, the defect that could not be solved even by restarting the application, that is, the defect that could not be solved at the third layer, can be solved by the second monitoring unit 22 that monitors the second layer that is higher than the third layer or by the first monitoring unit 21 that monitors the first layer that is further higher than the second layer.

In this way, the vehicle device 1 solves a defect that can be solved by restarting the application at the third layer, but if a defect that cannot be solved at the third layer occurs, the defect is solved by sending a notification to the second monitoring unit 22 or to the first monitoring unit 21 that is on an upper layer where a defect can be solved in a wider range.

In this way, the vehicle device 1 divides the system into the plurality of layers and monitors each layer, so that a defect that can be solved in each layer can be solved by the monitoring unit at each layer, and if the defect cannot be solved in a layer, such a defect would be solved by the monitoring unit at an upper layer.

According to the embodiment described above, following advantages can be attained.

The vehicle device 1 includes a control unit 10 having a system on which a plurality of OS 11A and OS 11B operate, and a plurality of monitoring units including a first monitoring unit 21, a second monitoring unit 22, and a third monitoring unit 23 for monitoring a defect in the system. Each of the plurality of monitoring units monitors a respective one of a plurality of layers into which the system is divided, and when a defect occurs, the defect is solved on a layer-by-layer basis.

As a result, for example, the range of restarting to solve the problem can be basically limited to each layer. As a result, it is possible to continue the operation of a function from which no defect occurs. Therefore, when a defect occurs under an environment where a plurality of functions are operating, it is possible to solve the defect while reducing a negative impact on functions that are normally operating.

Further, in the vehicle device 1, the plurality of monitoring units include a first monitoring unit 21 that performs monitoring at a first layer where the control unit 10 is a monitoring target, a second monitoring unit 22 that performs monitoring at a second layer above the control unit 10 where the OS 11 is a monitoring target, and a third monitoring unit 23 that performs monitoring at a third layer above the OS 11 where applications are monitoring targets.

Then, when a defect occurs in the control unit 10, the first monitoring unit 21 solves the defect by restarting the entire control unit 10. When a defect occurs in the OS 11, the second monitoring unit 22 solves the defect by restarting the OS 11 in which the defect occurs. When a defect occurs in an application, the third monitoring unit 23 solves the defect by restarting the application in which the defect occurs.

As a result, the vehicle device 1 can divide its own system into layers for each program level, in other words, for each layer unit that can be easily restarted. Therefore, it is possible to easily solve a defect by monitoring and restarting each layer.

Further, the vehicle device 1 includes the OS 11A having relatively high stability and the OS 11B having relatively low stability as compared with the OS11, and the second monitoring unit 22 is provided in the OS 11A to monitor the OS 11B. As a result, the OS 11B, which has a relatively high risk of occurrence of a defect, can be monitored from the highly stable OS 11A, and thus a defect can be detected and eliminated more reliably.

Further, at the vehicle device 1, if a defect cannot be solved even by restarting an application, the third monitoring unit 23 instructs the second monitoring unit 22 to solve the defect. And then, if the second monitoring unit 22 cannot solve the defect even by restarting the OS 11, the second monitoring unit 22 instructs the first monitoring unit 21 to solve the defect.

As a result, when a defect that cannot be solved at a layer occurs, it is possible to try to solve the defect at an upper layer that is directly above the layer, and if the defect cannot be solved at the latest upper layer, it is possible to restart the highest layer, that is, the entire control unit 10. Therefore, even if the defect cannot be solved in each layer, it can be finally solved.

In the embodiment, the second monitoring unit 22 is disposed in the OS 11A, but the second monitoring unit 22 may be also disposed in the OS 11B to monitor the other OS 11 by each other. Alternatively, as shown in FIG. 5, the second monitoring unit 22 may be disposed on the hypervisor 13 to monitor both the OS 11A and OS 11B. In this case, similarly to a case where three or more OSs 11 are implemented, each OS may be monitored by providing the second monitoring unit 22 in the OS 11A, providing the second monitoring unit 22 in each OS 11, or providing the second monitoring unit 22 on the hypervisor 13.

In the embodiment, a defect is solved by restarting programs. However, since the vehicle device 1 is connected to a large number of devices including ECUs 5, even if a program is restarted, inconsistency in operations may occur among devices such as peripheral circuits and ECUs 5. Then, if inconsistency occurs in operations, the program cannot be restored to a normal state even if the program is restarted. In other words, for the vehicle device 1, in addition to restarting the program, a measure to return devices to a normal state is required for cooperative operation with the devices such as peripheral circuits and the ECU 5.

Therefore, in the vehicle device 1, when the plurality of monitoring units solve a defect at each layer, devices used in each layer are included in an initialization target. As a result, for example, if a defect occurs in the navigation application 15 due to a defect in the center display circuit 18, it is possible to avoid a situation where the real cause for the defect is not eliminated even if the navigation application 15 is restarted, or a situation where applications are not linked or synchronized to each other due to incomplete operation and a further problem occurs after restarting. This also applies to the first layer and the second layer.

As shown in FIG. 5, each monitoring unit may perform different initial sequences subsequent to solving a defect between an exclusive device 30 that is used only by a single OS 11 and a shared device 31 that is commonly shared by a plurality of OSs 11.

For example, for the exclusive device 30, an initialization process is done upon restarting the OS 11, whereas for the shared device 31, services are temporarily stopped for the restarting target OS 11, and then the services are activated again for the restarting target OS 11 according to a normal restart sequence. As a result, the restarted OS 11 can use devices as usual. Such services include providing a virtual device for accessing to a physical device, initializing the virtual device, and the like.

In this case, the target devices may include the meter display circuit 17, the center display circuit 18, the communication circuit 19, and the operation input circuit 20 that are included in the vehicle device 1 and the meter display 2 and the center display 3 that are connected to the vehicle device 1. That is, devices controlled by the control unit 10 can be target devices.

For example, it is assumed that the exclusive device 30 is occupied by the OS 11A and the shared device 31 is shared by the OS 11A and the OS 11B. Then, when a defect occurs in the OA 11B at the second layer and the OA 11B is restarted, the shared device 31 can be restarted without restarting the exclusive device 30.

With such a configuration, it is possible to avoid a situation where devices are unnecessarily initialized. As a result, when the OS 11B is restarted at the second layer, for example, it is possible to decrease likelihood of occurrence of a problem that the normally operating OS 11A does not operate due to the initialization of the devices.

Furthermore, when a problem occurs in the control unit 10 at the first layer and the control unit 10 needs to be restarted, both the exclusive device 30 and the shared device 31 are restarted. Accordingly, it is possible to prevent devices from operating incompletely and affecting operation after the control unit 10 is restarted.

As the exclusive device 30 and the shared device 31, not only the so-called peripheral devices of the control unit 10, but also a cache memory in the control unit 10 may be included. Further, a virtual exclusive device 32 or a virtual shared device 33 in which the OS 11 is virtualized may be included. The virtual exclusive device 32 and the virtual shared device 33 are used to access to peripheral devices under a virtual environment. Furthermore, the above-described devices controlled by the control unit 10 can be target devices.

Further, in the embodiment, a defect or problem caused during the operation of the vehicle device 1 is shown. However, the processes shown in FIGS. 2 to 4 may be performed when operation for solving the defect is input by a user via the operation input circuit 20. In this case, if the operation of restarting an application is input but the defect cannot be solved by restarting the application, the defect would be solved at an upper layer.

Although the present disclosure has been described in accordance with the embodiments, it is understood that the present disclosure is not limited to such examples or structures. The present disclosure includes various modifications and deformations within an equivalent range. In addition, various combinations and forms, and further, other combinations and forms including only one element, or more or less than these elements are also within the spirit and the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be performed by the computer.

The invention claimed is:

1. A vehicle device, comprising:
a control unit in which a system is built, a plurality of operating systems operating on the system; and
a plurality of monitoring units that are configured to monitor a defect in the system, wherein
each of the plurality of monitoring units is further configured to:
perform monitoring at a respective one of a plurality of layers into which the system is divided; and
solve a defect at the respective one of the plurality of layers when the defect occurs, wherein
the plurality of monitoring units include a first monitoring unit that is configured to perform monitoring at a first layer outside of the control unit where the control unit is a monitoring target, a second monitoring unit that is configured to perform monitoring at a second layer in the system in the control unit where the plurality of operating systems are a monitoring target, and a third monitoring unit that is configured to perform monitoring at a third layer in the system on the plurality of operating systems where application programs are a monitoring target,
the first monitoring unit is configured to solve a defect by restarting the entire control unit when the defect occurs in the control unit,
the second monitoring unit is configured to, when a defect occurs in one of the plurality of operating systems, solve the defect by restarting the one of the plurality of operating systems, and
the third monitoring unit is configured to, when a defect occurs in one of the application programs, solve the defect by restarting the one of the application programs.

2. A vehicle device, comprising:
a control unit in which a system is built, a plurality of operating systems operating on the system; and
a plurality of monitoring units that are configured to monitor a defect in the system, wherein
each of the plurality of monitoring units is further configured to:
perform monitoring at a respective one of a plurality of layers into which the system are divided; and
solve a defect at the respective one of the plurality of layers when the defect occurs, and
each of the plurality of monitoring units is further configured to have a device, which is used at the respective one of the plurality of layers, included in an initialization target when solving a defect at the layer.

3. The vehicle device according to claim 1, wherein
the plurality of operating systems include a first operating system and a second operating system,
a stability of the first operating system is greater than a stability of the second operating system, and
the second monitoring unit is provided in the first operating system to monitor the second operating system.

4. The vehicle device according to claim 1, wherein
the third monitoring unit is further configured to instruct the second monitoring unit to solve the defect if the defect cannot be solved by restarting the one of the application programs,
the second monitoring unit is further configured to instruct the first monitoring unit to solve the defect if the defect cannot be solved by restarting the one of the plurality of operating systems, and
the defect is one of the defects that occurs in the control unit, in one of the plurality of operating systems, or in one of the application programs.

5. The vehicle device according to claim 2, wherein
the plurality of monitoring units are further configured to change an initialization sequence, which is conducted after the defect is solved, between an exclusive device that is exclusively owned by one of the plurality of operating systems and a shared device that is shared by the plurality of operating systems.

6. The vehicle device according to claim 1, wherein
the plurality of monitoring units are further configured to
solve a defect based on a user's operation that is input
to solve the defect.

* * * * *